US012592406B2

(12) United States Patent
Ochi

(10) Patent No.: US 12,592,406 B2
(45) Date of Patent: Mar. 31, 2026

(54) CELL STACK AND REDOX FLOW BATTERY

(71) Applicant: Sumitomo Electric Industries, Ltd.,
Osaka (JP)

(72) Inventor: Yuta Ochi, Osaka (JP)

(73) Assignee: Sumitomo Electric Industries, Ltd.,
Osaka (JP)

( * ) Notice: Subject to any disclaimer, the term of this
patent is extended or adjusted under 35
U.S.C. 154(b) by 559 days.

(21) Appl. No.: 18/030,217

(22) PCT Filed: Oct. 6, 2020

(86) PCT No.: PCT/JP2020/037918
§ 371 (c)(1),
(2) Date: Apr. 4, 2023

(87) PCT Pub. No.: WO2022/074747
PCT Pub. Date: Apr. 14, 2022

(65) Prior Publication Data
US 2023/0369627 A1     Nov. 16, 2023

(51) Int. Cl.
*H01M 8/18* (2006.01)
*H01M 4/96* (2006.01)
*H01M 8/0258* (2016.01)
*H01M 8/026* (2016.01)

(52) U.S. Cl.
CPC ............. *H01M 8/188* (2013.01); *H01M 4/96*
(2013.01); *H01M 8/0258* (2013.01); *H01M*
*8/026* (2013.01)

(58) Field of Classification Search
CPC ...... H01M 4/96; H01M 8/188; H01M 8/0258;
H01M 8/026; H01M 8/20; H01M 8/18
See application file for complete search history.

(56) References Cited

U.S. PATENT DOCUMENTS

| | | |
|---|---|---|
| 2017/0012299 A1 | 1/2017 | Itou et al. |
| 2020/0161669 A1 | 5/2020 | Dong et al. |
| 2022/0093942 A1 | 3/2022 | Fujita et al. |

FOREIGN PATENT DOCUMENTS

| | | |
|---|---|---|
| JP | 2015-122230 A | 7/2015 |
| JP | 2015-122231 A | 7/2015 |
| JP | 2015-138771 A | 7/2015 |
| JP | 2015-210849 A | 11/2015 |
| JP | 2020-126749 A | 8/2020 |
| JP | 2020-173891 A | 10/2020 |

(Continued)

*Primary Examiner* — Eugenia Wang
(74) *Attorney, Agent, or Firm* — Volpe Koenig

(57) ABSTRACT

A cell stack is in which a plurality of battery cells are stacked, including an electrode of a porous body, and a bipolar plate facing the electrode, in which the bipolar plate includes an introduction portion of an electrolyte, a discharge portion of the electrolyte, and a plurality of first grooves extending from a side at which the introduction portion is disposed toward a side at which the discharge portion is disposed, each of the plurality of first grooves allows the electrolyte in each of the plurality of first grooves flow toward the discharge portion, $R_2/R_1$ is $7 \times 10^{-11}$ or more and $2 \times 10^{-4}$ or less, $R_1$ is a permeation resistance indicating a difficulty of a flow of the electrolyte in the electrode, and $R_2$ is a permeation resistance indicating the difficulty of the flow of the electrolyte in each of the plurality of first grooves.

8 Claims, 6 Drawing Sheets

(56)                 References Cited

FOREIGN PATENT DOCUMENTS

| | | | |
|---|---|---|---|
| TW | 201530888 | A | 8/2015 |
| TW | 202036971 | A | 10/2020 |
| WO | 2019/012984 | A1 | 1/2019 |
| WO | 2020/158623 | A1 | 8/2020 |
| WO | 2020/158624 | A1 | 8/2020 |

CELL STACK AND REDOX FLOW BATTERY

TECHNICAL FIELD

The present disclosure relates to a cell stack and a redox flow battery.

BACKGROUND ART

As a large-capacity storage battery, a redox flow battery is known. For example, redox flow batteries disclosed in Patent Literatures 1 to 4 include a cell stack in which a plurality of battery cells are stacked. Charging and discharging are performed by circulating a positive electrolyte and a negative electrolyte in the battery cells.

Each of the battery cells includes a positive electrode, a negative electrode, and a membrane disposed between the positive and negative electrodes. A bipolar plate is disposed between battery cells adjacent in a stacking direction. The electrode is a porous body including an aggregate of carbon fibers or the like. In the bipolar plate including a groove, the groove facilitates spread of the electrolyte over the entire surface of the bipolar plate.

CITATION LIST

Patent Literature

PTL 1: Japanese Patent Laying-Open No. 2015-122230
PTL 2: Japanese Patent Laying-Open No. 2015-122231
PTL 3: Japanese Patent Laying-Open No. 2015-138771
PTL 4: Japanese Patent Laying-Open No. 2015-210849

SUMMARY OF INVENTION

A cell stack of the present disclosure is a cell stack in which a plurality of battery cells are stacked,
    the cell stack including an electrode of a porous body, and
      a bipolar plate facing the electrode, in which
    the bipolar plate includes
      an introduction portion of an electrolyte,
      a discharge portion of the electrolyte, and
      a plurality of first grooves extending from a side at which the introduction portion is disposed toward a side at which the discharge portion is disposed,
        each of the plurality of first grooves allows the electrolyte in each of the plurality of first grooves flow toward the discharge portion,
$R_2/R_1$ is $7\times10^{-11}$ or more and $2\times10^{-4}$ or less,
    $R_1$ is a permeation resistance indicating a difficulty of a flow of the electrolyte in the electrode, $$R_1=(L_1/K_1)\times\mu\times(1/S_1),$$

$L_1$ is a length of the electrode,
      $K_1$ is a permeability of the electrode,
      $\mu$ is a viscosity of the electrolyte,
      $S_1$ is a sectional area of the electrode,
    $R_2$ is a permeation resistance indicating the difficulty of the flow of the electrolyte in each of the plurality of first grooves, $$R_2=(32\times\mu\times L_2)/(de^2\times S_2),$$

$L_2$ is a length of each of the plurality of first grooves,
      de is an equivalent diameter of each of the plurality of first grooves, and
      $S_2$ is a sectional area of each of the plurality of first grooves.

A redox flow battery of the present disclosure includes the cell stack of the present disclosure.

DETAILED DESCRIPTION

Figure 1:
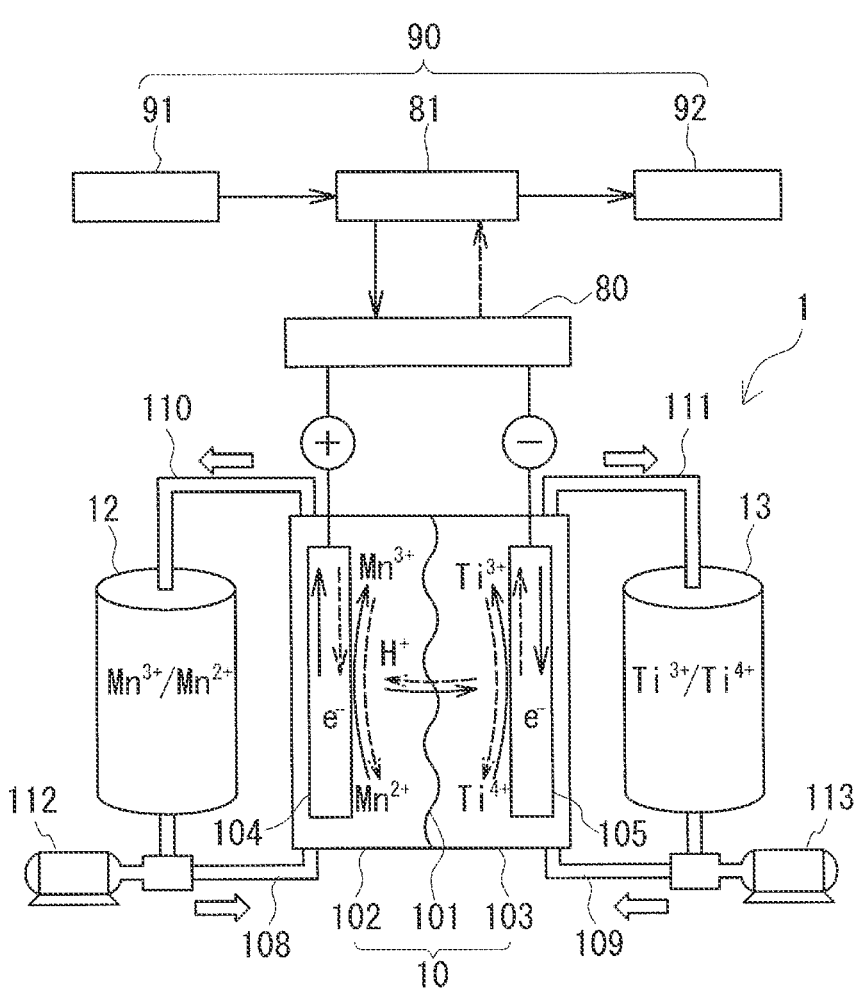
FIG. 1 is a diagram showing an operation principle of a redox flow battery according to an embodiment.

Problem to be Solved by the Present Disclosure

When flowability of an electrolyte in an electrode is low, a battery reaction in the electrode may be insufficient. As a result, reactive resistance in the electrode increases. In addition, when the flowability of the electrolyte in a groove of a bipolar plate is low, heat associated with the battery reaction tends to be trapped in the electrolyte. When temperature of the electrolyte increases, stability of the electrolyte decreases. As a result, reactive resistance in the electrode increases.

An object of the present disclosure is to provide a cell stack in which reactive resistance in an electrode is less likely to increase. Another object of the present disclosure is to provide a redox flow battery having excellent battery performance.

Description of Embodiments

The present inventor has intensively studied a configuration for reducing reactive resistance in an electrode of a cell stack. As a result, the present inventor has found that an increase in the reactive resistance in the electrode can be reduced by adjusting a difficulty of a flow of an electrolyte in the electrode and a difficulty of a flow of the electrolyte in a bipolar plate. Based on this finding, aspects of the present disclosure will be described below.

<1> A cell stack according to an embodiment is a cell stack
    in which a plurality of battery cells are stacked,
    the cell stack including an electrode of a porous body, and
      a bipolar plate facing the electrode, in which
    the bipolar plate includes
      an introduction portion of an electrolyte,
      a discharge portion of the electrolyte, and
      a plurality of first grooves extending from a side at which the introduction portion is disposed toward a side at which the discharge portion is disposed, each of the plurality of first grooves allows the electrolyte in each of the plurality of first grooves flow toward the discharge portion, $R_2/R_1$ is $7\times10^{-11}$ or more and $2\times10^{-4}$ or less, $R_1$ is a permeation resistance indicating a difficulty of a flow of the electrolyte in the electrode, $$R_1=(L_1/K_1)\times\mu\times(1/S_1),$$

$L_1$ is a length of the electrode, $K_1$ is a permeability of the electrode, $\mu$ is a viscosity of the electrolyte, $S_1$ is a sectional area of the electrode, $R_2$ is a permeation resistance indicating the difficulty of the flow of the electrolyte in each of the plurality of first grooves, $$R_2=(32\times\mu\times L_2)/(de^2\times S_2),$$

$L_2$ is a length of each of the plurality of first grooves, de is an equivalent diameter of each of the plurality of first grooves, and $S_2$ is a sectional area of each of the plurality of first grooves.

The present inventor has defined a new index of the permeation resistance that indicates the difficulty in the flow of the electrolyte. Aspect <1> defines permeation resistance $R_1$ in the electrode, permeation resistance $R_2$ in the first groove of the bipolar plate, and $R_2/R_1$ being $7\times10^{-11}$ or more and $2\times10^{-4}$ or less. When $R_2/R_1$ is within the above range, the electrolyte flowing through the first groove of the bipolar plate appropriately easily flows toward the electrode, and flowability of the electrolyte in the electrode is improved. As a result, an increase in a reactive resistance in the electrode is greatly reduced. Here, the range of $R_2/R_1$ in aspect <1> is $7\times10^{-9}\%$ or more and $2\times10^{-2}\%$ or less in percentage. Hereinafter, a value of $R_2/R_1$ may be expressed in percentage.

<2> In one aspect of the cell stack according to the embodiment, $R_2/R_1$ is $2\times10^{-10}$ or more and $1\times10^{-4}$ or less.

When $R_2/R_1$ is $2\times10^{-10}$ or more and $1\times10^{-4}$ or less, the increase in the reactive resistance in the electrode is further reduced as compared with aspect <1>. The range of $R_2/R_1$ in aspect <2> is $2\times10^{-8}\%$ or more and $1\times10^{-2}\%$ or less in percentage.

<3> In one aspect of the cell stack according to the embodiment, $R_2/R_1$ is $5\times10^{-9}$ or more and $3\times10^{-5}$ or less.

When $R_2/R_1$ is $5\times10^{-9}$ or more and $3\times10^{-5}$ or less, the increase in the reactive resistance in the electrode is further reduced as compared with aspects <1> and <2>. The range of $R_2/R_1$ in aspect <3> is $5\times10^{-7}\%$ or more and $3\times10^{-3}\%$ or less in percentage.

<4> In one aspect of the cell stack according to the embodiment, the electrode includes a plurality of materials having different permeabilities of the electrolyte.

The electrode including a plurality of materials having different permeabilities facilitates adjustment of the permeability of the electrode as a whole. It is therefore easy to obtain a cell stack satisfying the range of $R_2/R_1$ defined in aspects <1> to <3>.

<5> In one aspect of the cell stack according to the embodiment, the electrode includes a first layer including carbon felt or carbon cloth, and a second layer including carbon paper.

The carbon paper is less likely to be deformed than the carbon felt and the carbon cloth. Therefore, the electrode including the carbon paper is less likely to be deformed. The electrode that is less likely to be deformed is less likely to enter the first groove of the bipolar plate in contact with the electrode. Therefore, communication of the electrolyte is prevented from being hindered by the electrode that has entered the first groove. From the viewpoint of making the electrode less likely to enter the first groove, the second layer including carbon paper is preferably disposed so as to face the bipolar plate.

<6> In one aspect of the cell stack according to aspect <5>, the first layer has a quantity per unit area of 20 $g/m^2$ or more and 500 $g/m^2$ or less, and the second layer has a quantity per unit area of 10 $g/m^2$ or more and 100 $g/m^2$ or less.

When the quantity per unit area of the first layer and the quantity per unit area of the second layer satisfy the above ranges, the permeability of the electrolyte of the electrode as a whole tends to be an appropriate value. It is therefore easy to obtain a cell stack satisfying the range of $R_2/R_1$ defined in aspects <1> to <3>.

<7> In one aspect of the cell stack according to the embodiment, the bipolar plate includes a second groove, and the second groove allows two adjacent first grooves of the plurality of first grooves to communicate with each other.

The second groove facilitates the flow of the electrolyte in the two adjacent first grooves. Therefore, the permeation resistance in the first grooves is prevented from becoming excessively high.

<8> A redox flow battery according to the embodiment includes the cell stack according to any one of aspects <1> to <7>.

The redox flow battery according to the embodiment is excellent in battery performance. This is because the redox flow battery includes the cell stack according to the embodiment in which the increase in the reactive resistance in the electrode is suppressed.

Details of Embodiments of the Present Disclosure

Specific examples of the cell stack and the redox flow battery of the present disclosure will be described with reference to the drawings. Hereinafter, the redox flow battery may be referred to as an "RF battery". In the drawings, the same reference signs denote the same or corresponding parts. The present invention is not limited to the above examples but defined by the claims, and is intended to include meanings equivalent to the claims and all modifications within the scope.

First Embodiment

Outline of RF Battery

An RF battery 1 according to an embodiment will be described with reference to FIGS. 1 to 3. RF battery 1 shown in FIG. 1 is charged and discharged with a positive electrolyte containing a positive electrode active material and a negative electrolyte containing a negative electrode active material. The positive electrode active material and the negative electrode active material are typically metal ions whose valence is changed by oxidation-reduction. The metal ions contained in the positive electrolyte and the negative electrolyte shown in FIG. 1 are examples. In FIG. 1, a Ti—Mn-based RF battery containing Mn ions as a positive electrode active material and Ti ions as a negative electrode active material is exemplified. In FIG. 1, a solid arrow indicates a charge reaction and a broken arrow indicates a discharge reaction.

RF battery 1 is typically connected to a power system 90 via an AC/DC converter 80 or a transformer facility 81. RF battery 1 charges power generated by a power generation unit 91 or discharges charged power to a load 92. Power generation unit 91 is a power generation facility using natural energy such as solar power generation or wind power generation, a general power plant, or the like. RF battery 1 is used for, for example, load leveling, instantaneous voltage drop compensation, emergency power supply, and output smoothing of natural energy power generation.

Configuration of RF Battery

RF battery 1 includes a battery cell 10, a positive electrolyte tank 12, and a negative electrolyte tank 13. Battery cell 10 is responsible for charging and discharging. Positive electrolyte tank 12 stores a positive electrolyte. Negative electrolyte tank 13 stores a negative electrolyte.

Battery Cell

Battery cell 10 is separated into a positive electrode cell 102 and a negative electrode cell 103 by a membrane 101. Membrane 101 is an ion exchange film that does not permeate electrons but permeates hydrogen ions, for example. A positive electrode 104 is built in positive electrode cell 102. A negative electrode 105 is built in negative electrode cell 103.

A positive electrolyte and a negative electrolyte are respectively supplied to positive electrode cell 102 and negative electrode cell 103 constituting battery cell 10. RF battery 1 of this example includes a supply pipe 108 and a return pipe 110 that connect battery cell 10 and positive electrolyte tank 12. RF battery 1 of this example includes a supply pipe 109 and a return pipe 111 that connect battery cell 10 and negative electrolyte tank 13. Supply pipes 108 and 109 are provided with pumps 112 and 113, respectively. The positive electrolyte is supplied from positive electrolyte tank 12 to positive electrode cell 102 through supply pipe 108 by pump 112. The positive electrolyte discharged from positive electrode cell 102 through positive electrode cell 102 is returned to positive electrolyte tank 12 through return pipe 110. The negative electrolyte is supplied from negative electrolyte tank 13 to negative electrode cell 103 through supply pipe 109 by pump 113. The negative electrolyte discharged from negative electrode cell 103 through negative electrode cell 103 is returned to negative electrolyte tank 13 through return pipe 111. That is, supply pipes 108 and 109 and return pipes 110 and 111 constitute a circulation flow path.

Cell Stack

Figure 2:
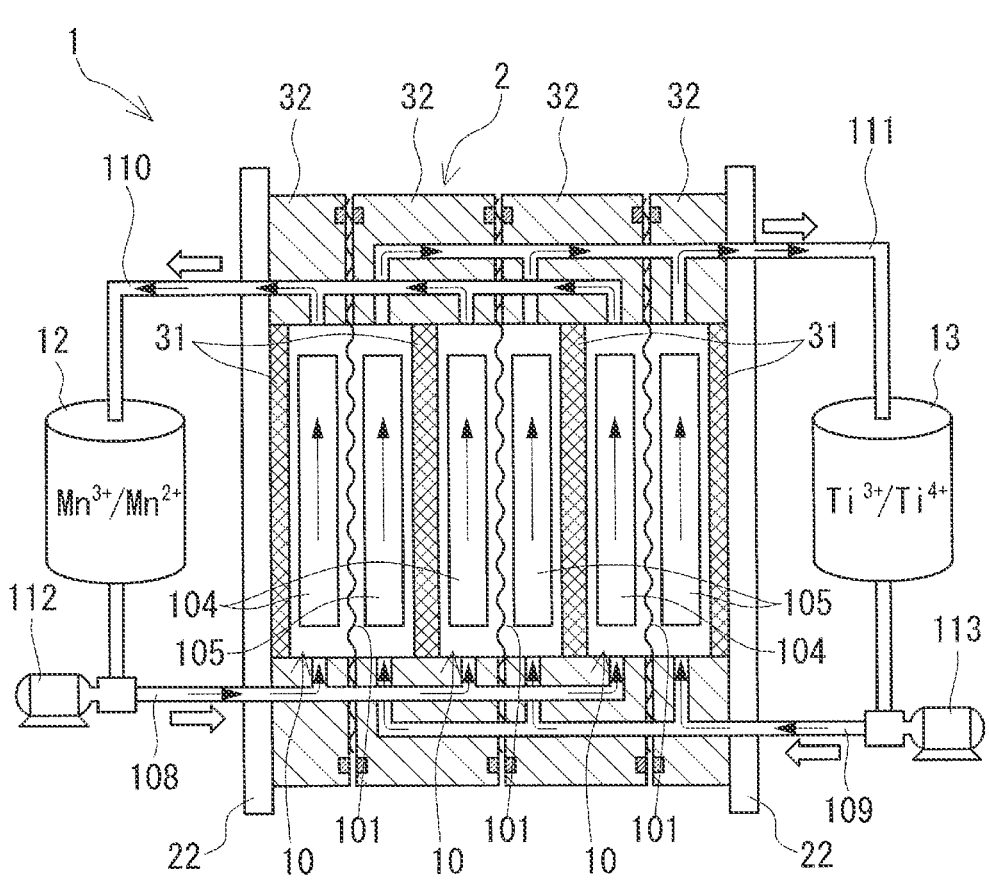
FIG. 2 is a schematic configuration diagram of the redox flow battery according to the embodiment.
Figure 3:
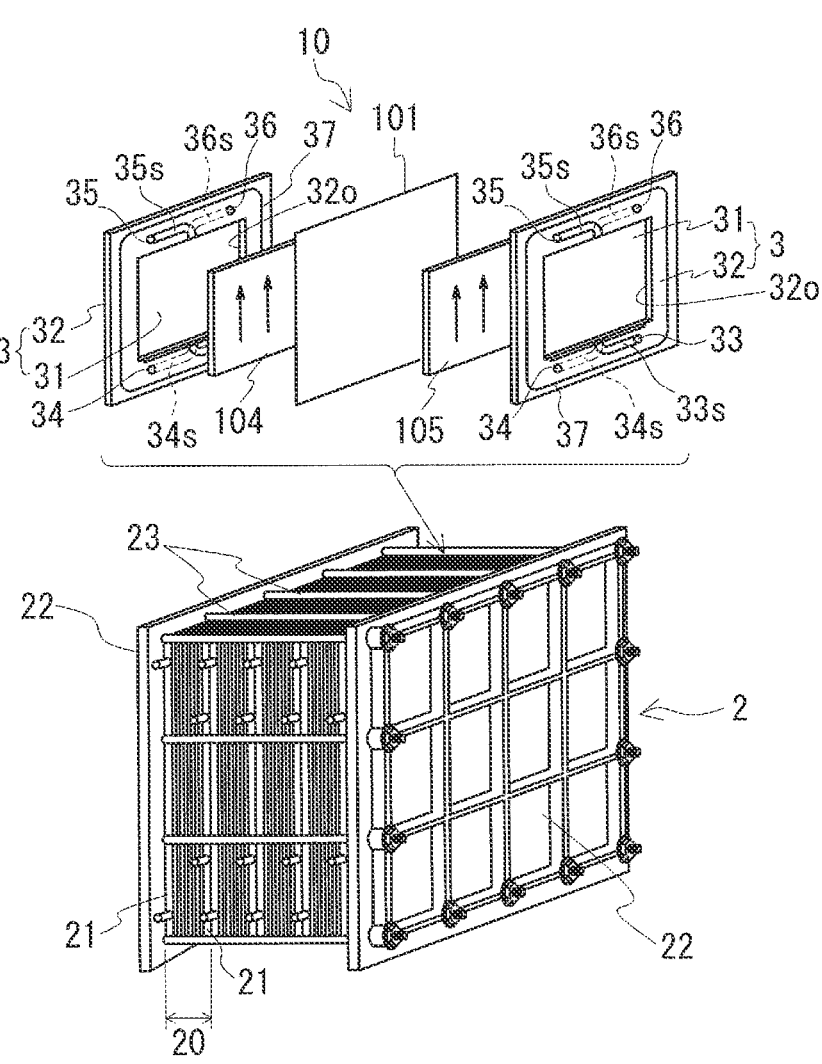
FIG. 3 is a schematic configuration diagram showing an example of a cell stack according to the embodiment.

As shown in FIGS. 2 and 3, RF battery 1 is usually used in a form called a cell stack 2 in which a plurality of battery cells 10 are stacked. Cell stack 2 has a configuration in which sub-stack 20 shown in FIG. 3 is sandwiched between two end plates 22 from both sides. Two end plates 22 are fastened in directions approaching each other by a fastening mechanism 23. FIG. 3 shows cell stack 2 including a plurality of sub-stacks 20. Sub-stack 20 includes a multilayer body in which a cell frame 3, positive electrode 104, membrane 101, and negative electrode 105 are repeatedly stacked in that order. Supply/drainage plates 21 are disposed at both ends of the multilayer body. Supply pipes 108 and 109 and return pipes 110 and 111 shown in FIGS. 1 and 2 constituting the circulation flow path described above are connected to the supply/drainage plate 21. The number of stacked battery cells 10 in cell stack 2 can be appropriately selected.

Cell frame 3 includes a bipolar plate 31 disposed between positive electrode 104 and negative electrode 105, and a frame body 32 provided around bipolar plate 31. A central region of bipolar plate 31 is exposed from a through-window 32o of frame body 32. Positive electrode 104 is disposed so as to face a first surface of bipolar plate 31. Negative electrode 105 is disposed so as to face a second surface of bipolar plate 31. The second surface is a surface opposite to the first surface. Positive electrode 104 and negative electrode 105 are accommodated inside frame body 32 with bipolar plate 31 interposed therebetween. Positive electrode 104 and negative electrode 105 are disposed between bipolar plates 31 of adjacent cell frames 3 with membrane 101 interposed therebetween to form one battery cell 10.

In frame body 32 of cell frame 3, liquid supply manifolds 33 and 34, liquid discharge manifolds 35 and 36, liquid supply slits 33s and 34s, and liquid discharge slits 35s and 36s are formed. In this example, the positive electrolyte is supplied from liquid supply manifold 33 to positive electrode 104 through liquid supply slit 33s. The positive electrolyte supplied to positive electrode 104 is discharged to liquid discharge manifold 35 through liquid discharge slit 35s. In a similar manner, the negative electrolyte is supplied from liquid supply manifold 34 to negative electrode 105 through liquid supply slit 34s. The negative electrolyte supplied to negative electrode 105 is discharged to liquid discharge manifold 36 through liquid discharge slit 36s. Liquid supply manifolds 33 and 34 and liquid discharge manifolds 35 and 36 penetrate frame body 32, and cell frames 3 are stacked to constitute flow paths of the electrolytes. Each of these flow paths communicates with supply pipes 108 and 109 and return pipes 110 and 111 shown in FIGS. 1 and 2 with supply/drainage plate 21 interposed therebetween. In cell stack 2, the positive electrolyte and the negative electrolyte can be communicated to battery cell 10 through the flow paths.

One of the characteristics of cell stack 2 of this example is to adjust the flow of the electrolytes from bipolar plate 31 to positive electrode 104 and negative electrode 105 in cell stack 2. For the adjustment, the configurations of positive electrode 104, negative electrode 105, and the bipolar plate 31 are adjusted. In the following description, positive electrode 104 and negative electrode 105 are simply referred to as an electrode 4 without distinction.

Electrode

Figure 4:
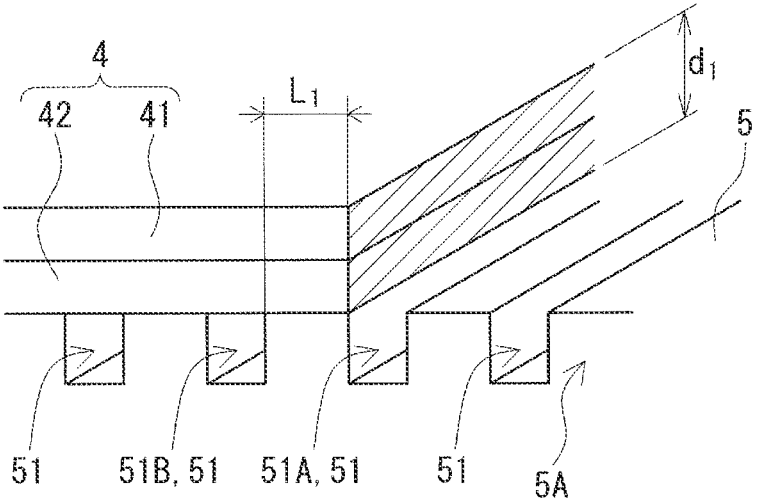
FIG. 4 is a schematic diagram showing a positional relationship between an electrode and a bipolar plate shown in a first embodiment.

The configuration of electrode 4 will be described with reference to FIG. 4. FIG. 4 shows a part of electrode 4 and a part of bipolar plate 5 facing electrode 4. Bipolar plate 5 is the same as bipolar plate 31 shown in FIG. 3. Bipolar plate 5 is provided with a first groove 51. First groove 51 will be described later.

Electrode 4 is a porous body having conductivity. For example, electrode 4 is a porous body including at least one selected from the group consisting of carbon, titanium, and tungsten.

Electrode 4 may include a single material or a plurality of materials. In particular, electrode 4 may include a plurality of materials having different permeabilities of electrolyte. Electrode 4 including a plurality of materials having different permeabilities facilitates adjustment of the permeability of electrode 4 as a whole. By adjusting the permeability of electrode 4, it is easy to obtain cell stack 2 in which $R_2/R_1$ described later satisfies a specific range.

Electrode 4 of this example includes a first layer 41 and a second layer 42 arranged in a thickness direction. Electrode 4 including first layer 41 and second layer 42 is an example of electrode 4 including a plurality of materials having different permeabilities. The number of layers constituting electrode 4 may be three or more.

First layer 41 and second layer 42 include, for example, carbon paper, carbon felt, or carbon cloth. The carbon cloth is a carbon fiber warp and weft alternately woven. The carbon felt is entangled independent carbon fibers. The carbon paper includes a plurality of carbon fibers and a binder that binds the carbon fibers. The carbon paper may include carbon particles. A preferable fiber diameter of the carbon fibers constituting the carbon felt and the carbon paper is 1 μm or more and 20 μm or less. A preferable fiber length of the carbon fibers constituting the carbon felt and the carbon paper is 500 μm or more and 100 mm or less. Examples of the binder of the carbon paper include an organic binder such as a phenol resin. The organic binder may be carbonized by heat treatment. The carbon paper is less likely to be deformed than the carbon felt and the carbon cloth. Therefore, electrode 4 including the carbon paper is less likely to be deformed. Electrode 4 that is less likely to be deformed is less likely to enter first groove 51 of bipolar plate 5 in contact with electrode 4. Therefore, the communication of the electrolyte in first groove 51 is prevented from being hindered by electrode 4 that has entered first groove 51.

First layer 41 includes, for example, carbon felt or carbon cloth. Second layer 42 includes, for example, carbon paper. From the viewpoint of making electrode 4 less likely to enter first groove 51, second layer 42 including carbon paper is preferably disposed so as to face bipolar plate 5. Inevitably, first layer 41 faces membrane 101 (see FIG. 3).

A quantity per unit area of first layer 41 is, for example, 20 g/m² or more and 500 g/m² or less. A quantity per unit area of second layer 42 is, for example, 10 g/m² or more and 100 g/m² or less. When the quantity per unit area of first layer 41 and the quantity per unit area of second layer 42 satisfy the above ranges, the permeability of the electrolyte of electrode 4 as a whole tends to be an appropriate value. As a result, it is easy to obtain cell stack 2 in which $R_2/R_1$ described later satisfies a specific range.

Bipolar Plate

Figure 5:
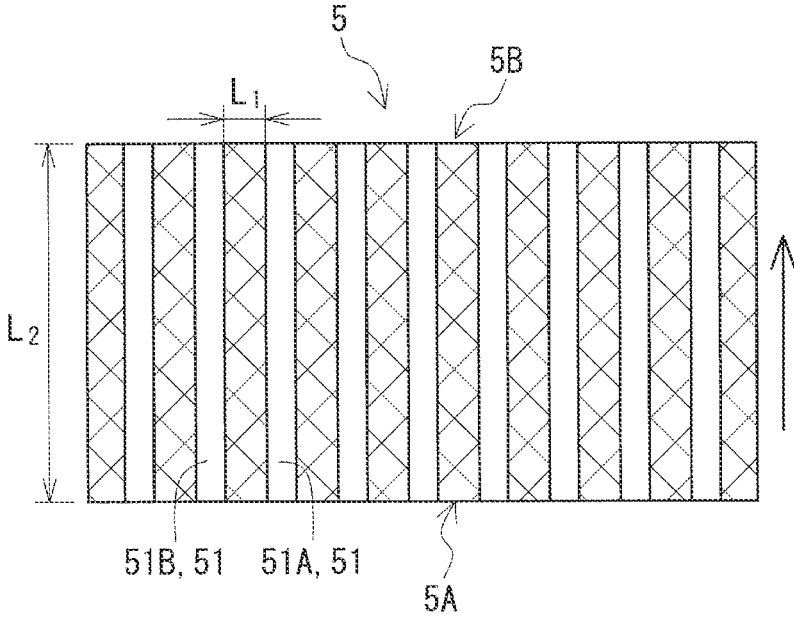
FIG. 5 is a schematic plan view of a bipolar plate shown in the first embodiment.

Bipolar plate 5 will be described mainly with reference to FIG. 5. Bipolar plate 5 shown in FIG. 5 is a portion exposed to through-window 32o of frame body 32 in FIG. 3. Bipolar plate 5 includes an introduction portion 5A for an electrolyte, a discharge portion 5B for an electrolyte, and a plurality of first grooves 51. In FIG. 5, portions excluding first grooves 51 are indicated by cross hatching.

Introduction portion 5A is a portion serving as an inlet of an electrolyte to bipolar plate 5. Discharge portion 5B is a portion serving as an outlet of the electrolyte discharged from bipolar plate 5. An overall flowing direction of the electrolyte in bipolar plate 5 of this example is a direction from the bottom to the top as indicated by a thick arrow on the right side. Therefore, introduction portion 5A of bipolar plate 5 in FIG. 5 is an entire lower edge of bipolar plate 5. Discharge portion 5B of bipolar plate 5 in FIG. 5 is an entire upper edge of bipolar plate 5.

First grooves 51 extend from introduction portion 5A toward discharge portion 5B in bipolar plate 5. In this example, an extending direction of first grooves 51 coincides with the overall flowing direction of the electrolyte. The electrolyte in first grooves 51 flows toward discharge portion 5B. First grooves 51 are all parallel to each other. First grooves 51 of this example is connected to both introduction portion 5A and discharge portion 5B. The electrolyte in first grooves 51 flows in a first direction from introduction portion 5A toward discharge portion 5B. Unlike this example, some first grooves 51 among the plurality of first grooves 51 may be inclined with respect to the flowing direction.

A width of first groove 51 is, for example, uniform in the extending direction of first groove 51. The width of first groove 51 is a length of an opening of first groove 51 orthogonal to the extending direction of first groove 51. The width of first groove 51 may change at different positions in the extending direction.

A depth of first groove 51 is, for example, uniform in the extending direction of first groove 51. The depth of first groove 51 is a length from the opening to a bottom of first groove 51. The bottom is the deepest portion of first groove 51. The depth of first groove 51 may change at different positions in the extending direction.

A sectional shape of first groove 51 is not limited. The sectional shape of first groove 51 is a contour shape of first groove 51 in a cross section orthogonal to the extending direction of first groove 51. The sectional shape of this example is rectangular. Examples of other sectional shapes include a V-shape, a semicircular shape, and a trapezoidal shape.

Adjustment of Flow of Electrolyte in Cell Stack

When flowability of the electrolyte in electrode 4 is low, a battery reaction in electrode 4 may be insufficient. In addition, when the flowability of the electrolyte in first groove 51 of bipolar plate 5 is low, heat associated with the battery reaction tends to be trapped in the electrolyte. When flowability of the electrolyte in first groove 51 is excessively high, the electrolyte flowing from first groove 51 toward electrode 4 decreases. That is, it is important that the flowability of the electrolyte in electrode 4 and the flowability of the electrolyte in first groove 51 of bipolar plate 5 are set in an appropriate balance. In the present embodiment, $R_1$ and $R_2$ are defined as indices indicating a difficulty of a flow of the electrolyte in cell stack 2.

$R_1$ is a permeation resistance indicating the difficulty of the flow of the electrolyte in electrode 4. $R_2$ is a permeation resistance indicating the difficulty of the flow of the electrolyte in first groove 51 of bipolar plate 5. The permeation resistance is a new index defined herein. The permeation resistance will be described later.

An object of this example is to adjust a balance between the difficulty of the flow of the electrolyte in electrode 4 and the difficulty of the flow of the electrolyte in first groove 51 of bipolar plate 5. Therefore, the present disclosure defines that $R_2/R_1$ falls within a predetermined range. Specifically, the range of $R_2/R_1$ expressed in percentage is $7 \times 10^{-9}$% or more and $2 \times 10^{-2}$% or less. When $R_2/R_1$ is within the above range, the electrolyte flowing through first groove 51 of bipolar plate 5 appropriately easily flows toward electrode 4, and the flowability of the electrolyte in electrode 4 is improved. As a result, the battery performance of the redox flow battery is improved. A more preferable range of $R_2/R_1$ is $2\times10^{-8}$% or more and $1\times10^{-2}$% or less. A still more preferable range of $R_2/R_1$ is $5\times10^{-7}$% or more and $3\times10^{-3}$% or less.

Permeation Resistance $R_1$

The permeation resistance $R_1$ in electrode 4 is as follows.

$$R_1=(L_1/K_1)\times\mu\times(1/S_1) \qquad \text{Equation 1-1}$$

$L_1$=length (m) of electrode 4
$K_1$=permeability (m²) of electrode 4
$\mu$ viscosity (Pa·s) of electrolyte
$S_1$=sectional area (m²) of electrode 4
A procedure for obtaining $R_1$ will be described below.

First, a relationship between a pressure loss $\Delta P_1$ of the electrolyte in electrode 4 and permeability $K_1$ satisfies the relationship of Equation 1-2 based on the Darcy's law.

$$\Delta P_1=(L_1/K_1)\times\mu\times(Q_1/S_1) \qquad \text{Equation 1-2}$$

$K_1$: Permeability (m²)
$\Delta P_1$: Pressure loss (Pa)
$Q_1$: Flow rate (m³/s) of electrolyte
$\mu$: Viscosity (Pa·s) of electrolyte
$L_1$: Length (m) of electrode 4
$S_1$: Sectional area (m²) of electrode 4
Permeability $K_1$ is a value unique to electrode 4 regardless of the type of fluid. Permeability $K_1$ is obtained based on an actual measurement value using a test cell. Specifically, the test cell is produced by using the same electrode 4 as electrode 4 provided in cell stack 2. A compressed state of electrode 4 in the test cell is set to be the same as a compressed state of electrode 4 in cell stack 2. A tank is connected to the test cell via a pipe, and a fluid having a known viscosity, such as water, flows through the test cell. A flow meter and a differential pressure gauge are connected to the pipe in advance. The differential pressure gauge is a device that measures pressure loss $\Delta P_1$ based on a pressure of the electrolyte at an inlet of the test cell and a pressure of the electrolyte at an outlet of the test cell. Since a dimension of electrode 4 of the test cell can be measured, a value other than permeability $K_1$ in Equation 1-2 is actually measured. By substituting the actual measurement value into Equation 1-2, permeability $K_1$ is obtained.

Next, a relationship between pressure loss $\Delta P_1$ of the electrolyte in electrode 4, a flow rate $Q_1$, and permeation resistance $R_1$ is expressed as in an equation of V =I×R in an electric circuit, and Equation 1-3 is defined.

$$\Delta P_1=Q_1\times R_1 \qquad \text{Equation 1-3}$$

By substituting Equation 1-2 into Equation 1-3, Equation 1-1 is obtained. The unit of $R_1$ is Pa·s/m³.

Permeation Resistance $R_2$

Permeation resistance $R_2$ of the electrolyte in first groove 51 of bipolar plate 5 is as follows.

$$R_2=(32\times\mu\times L_2)/(de^2\times S_2) \qquad \text{Equation 2-1}$$

$L_2$=length (m) of first groove 51
de=equivalent diameter (m) of first groove 51
$S_2$=sectional area (m²) of first groove 51
A procedure for obtaining $R_2$ will be described below. First, a pressure loss $\Delta P_2$ of the electrolyte due to friction between the electrolyte flowing in a circular pipe and a pipe wall is considered. Pressure loss $\Delta P_2$ is obtained by the following Darcy-Weisbach Equation.

$$\Delta P_2=\lambda\times(L_2/d)\times\rho/2\times(Q_2/S_2)^2 \qquad \text{Equation 2-2}$$

$\lambda$: Pipe friction coefficient
$L_2$: Length (m) of circular pipe
d: Inner diameter (m) of circular pipe
$\rho$: Density (kg/m³) of electrolyte
$Q_2$: Flow rate (m³/s) of electrolyte
$S_2$: Sectional area (m²) of circular pipe
Next, a Reynolds number Re indicating a flow state of a fluid is expressed by the following equation.

$$Re=\rho\times Q_2/S_2\times d/\mu \qquad \text{Equation 2-3}$$

$\mu$: Viscosity (Pa·s) of fluid
When Re is 2300 or less, the flow in the circular pipe is a layer flow. In this case, a pipe friction coefficient $\lambda$ is obtained from the following equation based on the Hagen-Poiseuille's law.

$$\lambda=64/Re \qquad \text{Equation 2-4}$$

By substituting Equation 2-3 into Equation 2-4, the following equation is obtained.

$$\lambda=(64\times S_2\times\mu)/(\rho\times Q_2\times d) \qquad \text{Equation 2-5}$$

By substituting Equation 2-5 into Equation 2-2, pressure loss $\Delta P_2$ is expressed by the following equation.

$$\Delta P_2=(32\times\mu\times L_2\times Q_2)/(d^2\times S_2) \qquad \text{Equation 2-6}$$

The sectional shape of first groove 51 in bipolar plate 5 is not circular. Thus, an inner diameter d to be substituted into Equation 2-6 cannot be obtained. Therefore, an equivalent diameter de obtained from a dimension of first groove 51 is obtained. Equivalent diameter de is obtained by the following Equation 2-7.

$$de=4\times(S_2/W) \qquad \text{Equation 2-7}$$

Figure 6A:
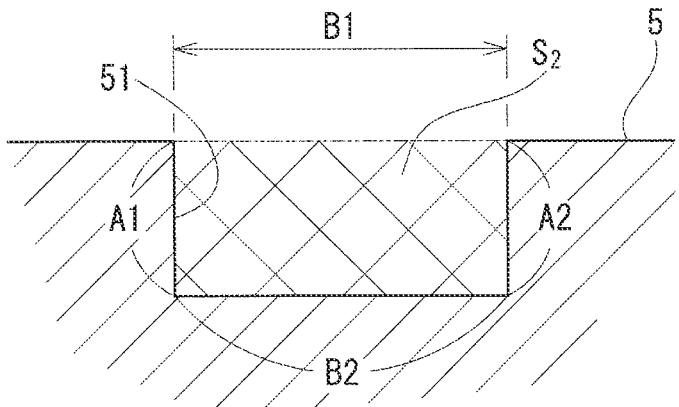
FIG. 6A is a schematic sectional view of a first groove of the bipolar plate shown in the first embodiment.
Figure 6B:
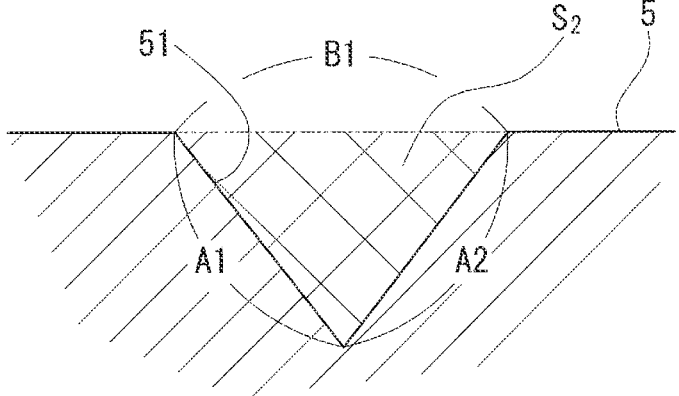
FIG. 6B is a schematic sectional view of a first groove having a V-shaped sectional shape.

$S_2$: Sectional area (m²) of first groove 51
W: Outer peripheral length (m) of first groove 51
Here, W is a peripheral length of first groove 51 including the opening of first groove 51. How to obtain W will be described with reference to sectional views of FIGS. 6A and 6B. As shown in FIG. 6A, when first groove 51 is a rectangular groove, W=A1+A2+B1+B2. A1 and A2 are lengths of side walls of first groove 51. B1 is a width of the opening of first groove 51. B2 is a width of the bottom of first groove 51. As shown in FIG. 6B, when first groove 51 is a V-shaped groove, W=A1+A2+B1. A1 and A2 are lengths of side walls of first groove 51. B1 is a width of the opening of first groove 51. Sectional area $S_2$ of first groove 51 is an area of a portion surrounded by an inner peripheral surface and the opening of first groove 51 as indicated by cross hatching in FIGS. 6A and 6B.

By substituting de of Equation 2-6 into d of Equation 2-7 and regarding the length of the circular pipe as the length of first groove 51, pressure loss $\Delta P_2$ of the electrolyte in first groove 51 of bipolar plate 5 is obtained.

$$\Delta P_2=(32\times\mu\times L_2\times Q_2)/(de^2\times S_2) \qquad \text{Equation 2-8}$$

$L_2$: Length of first groove 51
Next, a relationship between pressure loss $\Delta P_2$ of the electrolyte in first groove 51 of bipolar plate 5, a flow rate $Q_2$, and permeation resistance $R_2$ is expressed as in an equation of V=I×R in an electric circuit, and Equation 2-9 is defined.

$$\Delta P_2=Q_2\times R_2 \qquad \text{Equation 2-9}$$

By substituting Equation 2-9 into Equation 2-8, Equation 2-1 is obtained. The unit of $R_2$ is Pa·s/m³.

$R_2/R_1$

Equation 1-1 is substituted for $R_1$ in $R_2/R_1$, and Equation 2-1 is substituted for $R_2$. As a result, the following Equation 3-1 is obtained.

$$R_2/R_1 = (32 \times L_2 \times S_1 \times K_1)/(de^2 \times S_2 \times L_1) \qquad \text{Equation 3-1}$$

As shown in Equation 3-1, in order to obtain $R_2/R_1$, $L_1$ and $S_1$ in electrode 4 and $L_2$, $S_2$, and de of first groove 51 in bipolar plate 5 by actual measurement are required. Here, it will be described which parts of electrode 4 and bipolar plate 5 are related to variables to be substituted into Equation 3-1.

One of the objects of the present disclosure is to allow an appropriate amount of an electrolyte to flow from first groove 51 of bipolar plate 5 toward electrode 4 so that the electrolyte quickly flows in electrode 4. Therefore, in this example, the difficulty of the flow of the electrolyte from one first groove 51A of two adjacent first grooves 51 to the other first groove 51B of two adjacent first grooves 51 through electrode 4 is used as an evaluation criterion.

In the evaluation criterion, a direction of the flow of the electrolyte in electrode 4 is a direction intersecting with, or typically, orthogonal to the extending direction of first groove 51. Therefore, length $L_1$ of electrode 4 is a distance between first groove 51A and first groove 51B adjacent to each other. This distance is also a width of a ridge between two adjacent first grooves 51A and 51B.

A direction of the electrolyte from first groove 51 toward electrode 4 is a direction intersecting with, or typically, orthogonal to the extending direction of first groove 51. Thus, length $L_2$ of first groove 51 is a length at which two adjacent first grooves 51 overlap each other in the extending direction of first grooves 51 (see FIG. 5). In this example, first grooves 51 is connected to introduction portion 5A and discharge portion 5B. Therefore, length $L_2$ of first groove 51 of this example is equal to the length of bipolar plate 5 along the overall flowing direction of the electrolyte.

Sectional area $S_1$ of electrode 4 is a product of a thickness $d_1$ (see FIG. 4) and length $L_2$ of electrode 4. Thickness $d_1$ is a thickness of electrode 4 compressed in cell stack 2.

A method of obtaining permeability $K_1$, equivalent diameter de, and sectional area $S_2$ of first groove 51 is as described above.

Others

Here, when electrode 4 includes first layer 41 and second layer 42, permeation resistance $R_1$ of electrode 4 is obtained by the following equation.

$$1/R_1 = (1/R_{1-1}) + (1/R_{1-2}) \qquad \text{Equation 4-1}$$

$R_{1-1}$: Permeation resistance of electrolyte in first layer 41
$R_{1-2}$: Permeation resistance of electrolyte in second layer 42

Effects

Cell stack 2 satisfies $7 \times 10^{-9}\% \leq R_2/R_1 \leq 2 \times 10^{-2}\%$. When $R_2/R_1$ satisfies the above range, the electrolyte flowing through first groove 51 of bipolar plate 5 in cell stack 2 appropriately easily flows toward electrode 4, and the flowability of the electrolyte in the electrode 4 is improved. As a result, an increase in reactive resistance in electrode 4 of cell stack 2 is greatly reduced. RF battery 1 including cell stack 2 described above is excellent in the battery performance.

Second Embodiment

In a second embodiment, a bipolar plate 5 having a configuration different from bipolar plate 5 of the first embodiment will be described with reference to FIG. 7.

Figure 7:
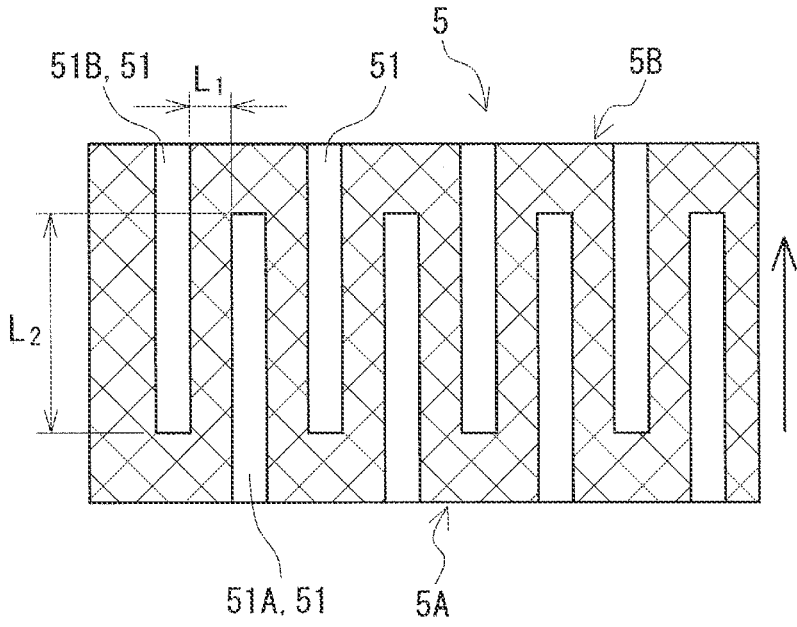
FIG. 7 is a schematic plan view of a bipolar plate shown in a second embodiment.

As shown in FIG. 7, bipolar plate 5 of this example includes a first groove 51A connected to introduction portion 5A but not connected to discharge portion 5B, and a first groove 51B connected to discharge portion 5B but not connected to introduction portion 5A. First groove 51A and first groove 51B are alternately arranged in a direction orthogonal to the overall flowing direction of the electrolyte.

In this example, a length $L_2$ of first groove 51 for obtaining $R_2/R_1$ is different from length $L_2$ in the first embodiment. Length $L_2$ is a length at which adjacent first grooves 51A and 51B overlap each other in the extending direction of first grooves 51. Therefore, length $L_2$ of this example is shorter than the length of bipolar plate 5 in the overall flowing direction of the electrolyte.

Third Embodiment

Figure 8:
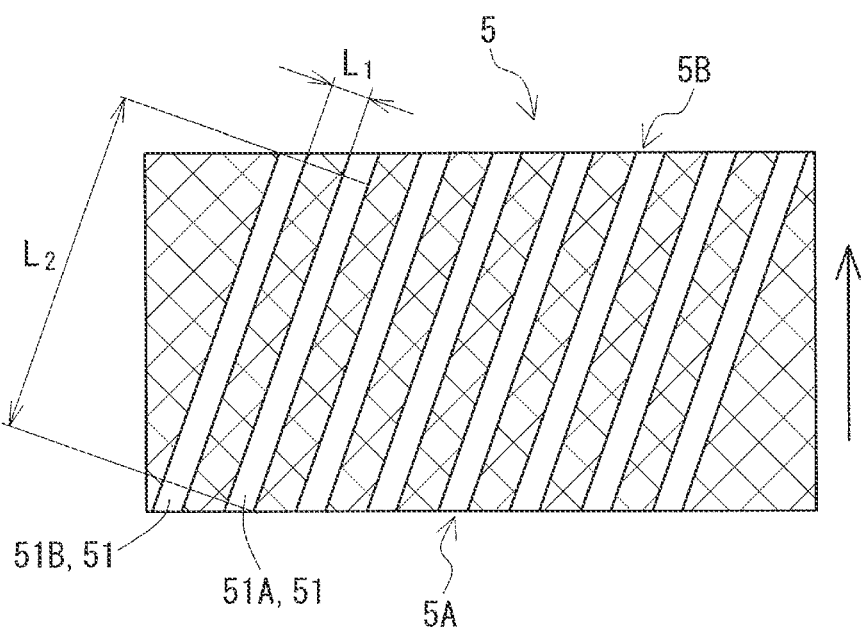
FIG. 8 is a schematic plan view of a bipolar plate shown in a third embodiment.

In a third embodiment, a bipolar plate 5 having a configuration different from bipolar plate 5 of the first and second embodiments will be described with reference to FIG. 8.

An extending direction of first grooves 51 of this example is inclined with respect to the overall flowing direction of the electrolyte. In this case, the electrolyte in first grooves 51 also flows in the first direction from introduction portion 5A toward discharge portion 5B.

In this example, a direction of length $L_2$ of first groove 51 of bipolar plate 5 to be substituted into Equation 3-1 to obtain $R_2/R_1$ is inclined with respect to the overall flowing direction of the electrolyte. Length $L_2$ is a length at which two first grooves 51 overlap each other in a direction in which two adjacent first grooves 51 are arranged in parallel. Length $L_1$ of electrode 4 (see FIG. 4) is the width of the ridge as in the first embodiment.

Fourth Embodiment

Figure 9:
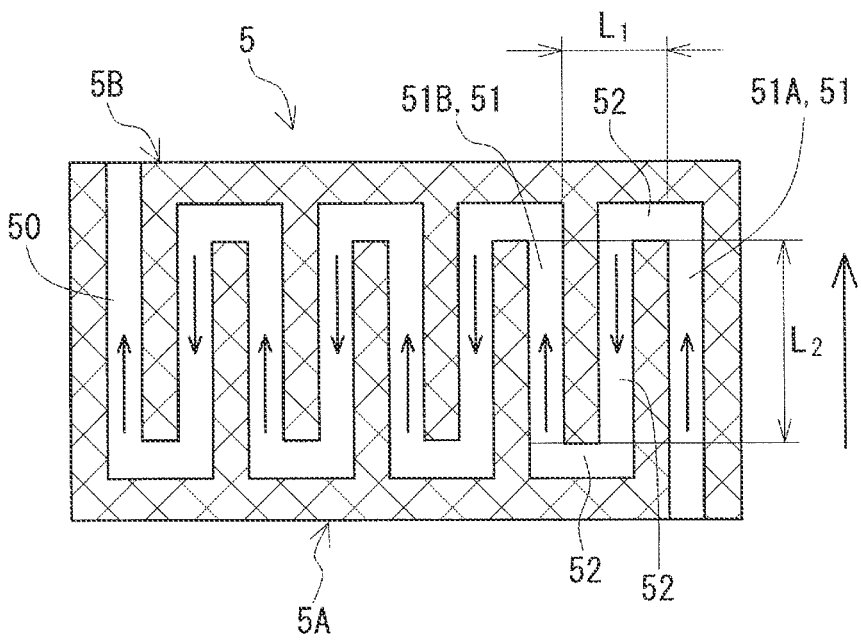
FIG. 9 is a schematic plan view of a bipolar plate shown in a fourth embodiment.

In a fourth embodiment, a bipolar plate 5 having a first groove 51 different from first groove 51 of the first to third embodiments will be described with reference to FIG. 9.

Bipolar plate 5 of this example includes one meandering groove 50. A first end of meandering groove 50 is connected to introduction portion 5A, and a second end of meandering groove 50 is connected to discharge portion 5B. A flow of the electrolyte in meandering groove 50 is indicated by a thick line arrow. Meandering groove 50 of this example is constituted by connecting a first groove 51 and a second groove 52. First groove 51 is a portion of meandering groove 50 through which the electrolyte flows in a direction along the overall flow of the electrolyte. Second groove 52 is a portion of meandering groove 50 that allows adjacent first grooves 51A and 51B to communicate with each other. That is, second groove 52 is an S-shaped portion including a lateral groove closer to discharge portion 5B, a lateral groove closer to introduction portion 5A, and a longitudinal groove connecting both of the lateral grooves. The lateral groove closer to discharge portion 5B extends in a direction orthogonal to the overall flowing direction of the electrolyte, and is connected to an end of first groove 51A closer to discharge portion 5B. The lateral groove closer to introduction portion 5A extends in a direction orthogonal to the overall flowing direction of the electrolyte, and is connected to an end of first groove 51B closer to introduction portion 5A. The longitudinal groove extends along the overall flowing direction of the electrolyte, and connects the two lateral grooves. A flowing direction of the electrolyte in the longitudinal groove is a direction toward introduction portion 5A. Therefore, the longitudinal groove is not first groove 51 that allows the electrolyte to flow toward discharge portion 5B.

In this example, the presence of second groove 52 is ignored in obtaining $R_2/R_1$. Therefore, length $L_1$ of electrode 4 to be substituted into Equation 3-1 is a distance between first groove 51A and first groove 51B at the closest position. Length $L_2$ of bipolar plate 5 to be substituted into Equation 3-1 is a length at which first groove 51A and first groove 51B overlap each other in the extending direction of first groove 51.

Test Example

In a test example, an influence of the size of $R_2/R_1$ in the cell stack on an increase of the reactive resistance in the electrode of the cell stack was examined. The superiority and inferiority of the reactive resistance in the electrode were evaluated by reactive resistivity ($\Omega \cdot cm^2$).

Cell stacks of samples Nos. 1 to 12 were prepared. A difference between these cell stacks lies in the configuration of the electrodes. The electrode of sample No. 1 was an electrode having a single layer structure. The electrodes of samples Nos. 2 to 12 were electrodes having a two-layer structure including a first layer and a second layer. The structure of the electrodes is shown in Table 1. A quantity per unit area ($g/m^2$) of each layer of the electrodes is also shown in Table 1.

In addition, $R_2/R_1$ in the cell stack of each sample was obtained by calculation. A method for obtaining $R_2/R_1$ is as described above. Values of $R_2/R_1$ are shown in Table 1. $R_2/R_1$ in the table is shown in percentage.

The reactive resistivities ($\Omega \cdot cm^2$) of the cell stacks of samples Nos. 1 to 12 were determined. A measurement method is as follows. First, the cell stack of each sample was charged and discharged at a constant current with a current density of 90 mA/cm$^2$. In this test, charge and discharge were performed for a plurality of cycles. In the test, an upper limit and a lower limit of a switching voltage were set, charge was switched to discharge when the voltage reached the upper limit during charging, and discharge was switched to charge when the voltage reached the lower limit during discharging. After charging and discharging of each cycle, the cell resistivity ($\Omega \cdot cm^2$) was determined for each sample. An average voltage at a time of charge and an average voltage at a time of discharge in any one cycle of a plurality of cycles were obtained, and the cell resistivity was defined as {(a difference between the average voltage at the time of charge and the average voltage at the time of discharge)/(an average current/2)}×an cell effective area. The cell resistivity is determined by the sum of a conductive resistivity and a reactive resistivity. The conductive resistivity is determined by measuring an electric resistance of the cell stack with a battery high tester. Therefore, the reactive resistivity is obtained by subtracting the conductive resistivity from the cell resistivity.

TABLE 1

| | Electrode | | | Quantity per unit area [g/m²] | | Reactive |
| Sample No. | First layer | Second layer | $R_2/R_1$ [%] | First layer | Second layer | resistivity [$\Omega \cdot cm^2$] |
|---|---|---|---|---|---|---|
| 1 | Carbon felt | — | $9 \times 10^{-9}$ | 428 | — | 0.22 |
| 2 | Carbon felt | Carbon paper | $3 \times 10^{-8}$ | 377 | 25 | 0.21 |
| 3 | Carbon felt | Carbon paper | $7 \times 10^{-7}$ | 301 | 48 | 0.19 |
| 4 | Carbon felt | Carbon paper | $1 \times 10^{-6}$ | 322 | 83 | 0.18 |
| 5 | Carbon felt | Carbon paper | $3 \times 10^{-3}$ | 130 | 30 | 0.19 |
| 6 | Carbon cloth | Carbon paper | $1 \times 10^{-2}$ | 85 | 35 | 0.21 |
| 7 | Carbon felt | Carbon paper | $3 \times 10^{-12}$ | 453 | 62 | 0.42 |
| 8 | Carbon felt | Carbon paper | $5 \times 10^{-2}$ | 72 | 46 | 0.39 |
| 9 | Carbon felt | Carbon paper | $1 \times 10^{-8}$ | 555 | 28 | 0.26 |
| 10 | Carbon felt | Carbon paper | $1 \times 10^{-2}$ | 15 | 37 | 0.31 |
| 11 | Carbon felt | Carbon paper | $1 \times 10^{-7}$ | 289 | 8 | 0.33 |
| 12 | Carbon felt | Carbon paper | $9 \times 10^{-2}$ | 85 | 117 | 0.34 |

As shown in Table 1, the reactive resistivities of samples Nos. 1, 2, 3, 4, 5, 6, 9, 10, and 11 in which $R_2/R_1$ were $7\times10^{-9}$% or more and $2\times10^{-2}$% or less was lower than the reactive resistivities of the other samples. Therefore, it has been found that the fact that $R_2/R_1$ satisfies $7\times10^{-9}$% or more and $2\times10^{-2}$% or less has a great influence on reducing an increase in the reactive resistance in the electrode of the cell stack.

The reactive resistivities of samples Nos. 2 to 6 in which $R_2/R_1$ were $3\times10^{-8}$% or more and $1\times10^{-2}$% or less was lower than the reactive resistivities of the other samples. The reactive resistivities of samples Nos. 3 to 5 in which $R_2/R_1$ was $7\times10^{-7}$% or more and $3\times10^{-3}$% or less were lower than the reactive resistivities of samples Nos. 2 and 6. Here, even when $R_2/R_1$ was $3\times10^{-8}$% or more and $1\times10^{-2}$% or less, the reactive resistance of samples Nos. 10 and 11 having a layer with an extremely small quantity per unit area tended to increase.

REFERENCE SIGNS LIST

1: redox flow battery (RF battery)

10: battery cell

12: positive electrolyte tank, 13: negative electrolyte tank

101: membrane, 102: positive electrode cell, 103: negative electrode cell

104: positive electrode, 105: negative electrode

108, 109: supply pipe, 110, 111: return pipe

112, 113: pump

80: AC/DC converter, 81: transformer facility

90: power system, 91: power generation unit, 92: load

2: cell stack

20: sub-stack

21: supply/drainage plate, 22: end plate, 23: fastening mechanism

3: cell frame

31: bipolar plate, 32: frame body, 32*o*: through-window

33, 34: liquid supply manifold, 35, 36: liquid discharge manifold

33*s*, 34*s*: liquid supply slit, 35*s*, 36*s*: liquid discharge slit

4: electrode

41: first layer, 42: second layer

5: bipolar plate

5A: introduction portion, 5B: discharge portion

50: meandering groove

51, 51A, 51B: first groove, 52: second groove

The invention claimed is:

1. A cell stack in which a plurality of battery cells are stacked, the cell stack comprising:

an electrode of a porous body; and a bipolar plate facing the electrode, wherein the bipolar plate includes an introduction portion of an electrolyte, a discharge portion of the electrolyte, and a plurality of first grooves extending from a side at which the introduction portion is disposed toward a side at which the discharge portion is disposed, each of the plurality of first grooves allows the electrolyte in each of the plurality of first grooves flow toward the discharge portion, $R_2/R_1$ is $7 \times 10^{-11}$ or more and $2 \times 10^{-4}$ or less, $R_1$ is a permeation resistance indicating a difficulty of a flow of the electrolyte in the electrode, $$R_1 = (L_1/K_1) \times \mu \times (1/S_1),$$

$L_1$ is a length of the electrode, $K_1$ is a permeability of the electrode, $\mu$ is a viscosity of the electrolyte, $S_1$ is a sectional area of the electrode, $R_2$ is a permeation resistance indicating the difficulty of the flow of the electrolyte in each of the plurality of first grooves, $$R_2 = (32 \times \mu \times L_2)/(de^2 \times S_2),$$

$L_2$ is a length of each of the plurality of first grooves, de is an equivalent diameter of each of the plurality of first grooves, and $S_2$ is a sectional area of each of the plurality of first grooves.

2. The cell stack according to claim 1, wherein $R_2/R_1$ is $2 \times 10^{-10}$ or more and $1 \times 10^{-4}$ or less.

3. The cell stack according to claim 1, wherein $R_2/R_1$ is $5 \times 10^{-9}$ or more and $3 \times 10^{-5}$ or less.

4. The cell stack according to claim 1, wherein the electrode includes a plurality of materials having different permeabilities of the electrolyte.

5. The cell stack according to claim 1, wherein the electrode includes a first layer including carbon felt or carbon cloth, and a second layer including carbon paper.

6. The cell stack according to claim 5, wherein the first layer has a quantity per unit area of 20 g/m$^2$ or more and 500 g/m$^2$ or less, and the second layer has a quantity per unit area of 10 g/m$^2$ or more and 100 g/m$^2$ or less.

7. The cell stack according to claim 1, wherein the bipolar plate includes a second groove, and the second groove allows two adjacent first grooves of the plurality of first grooves to communicate with each other.

8. A redox flow battery comprising the cell stack according to claim 1.

\* \* \* \* \*